Dec. 8, 1925.
H. A. CORLISS
1,564,532
AUTO HEADLIGHT
Filed July 15, 1925
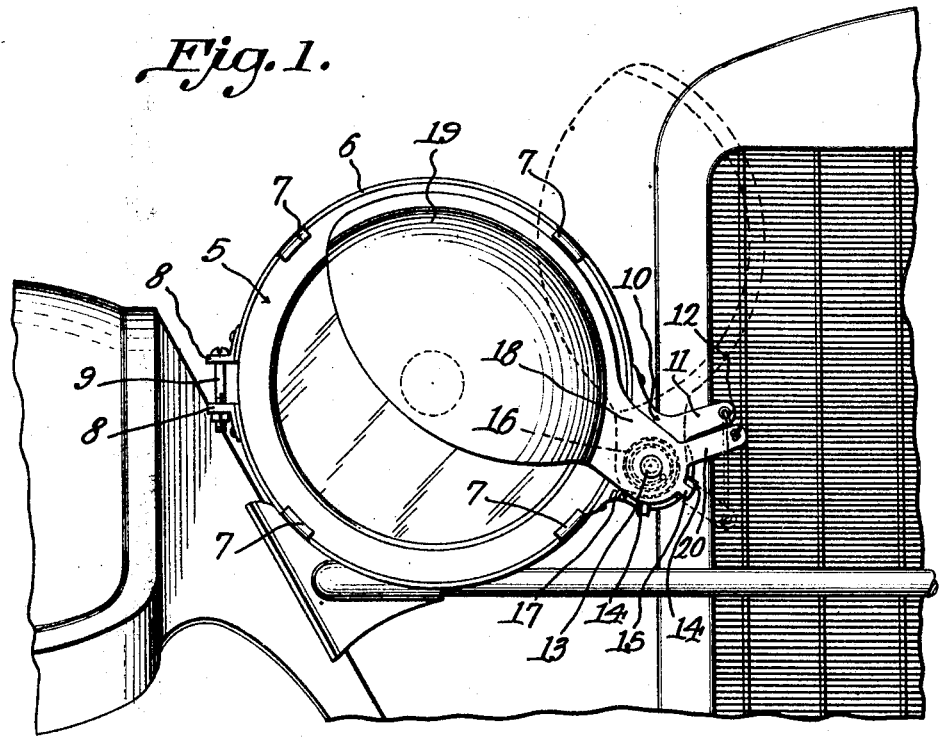
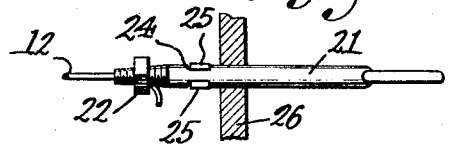
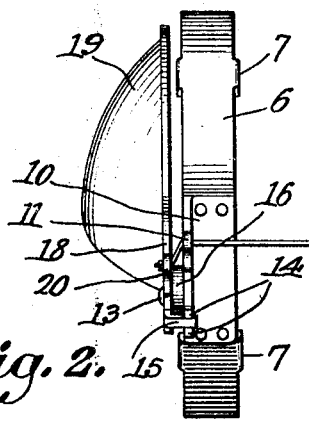
Inventor
Herbert A. Corliss
By C. A. Snow & Co
Attorneys Patented Dec. 8, 1925.

1,564,532

UNITED STATES PATENT OFFICE.

HERBERT A. CORLISS, OF GRANTS PASS, OREGON.

AUTO HEADLIGHT.

Application filed July 15, 1925. Serial No. 43,817.

*To all whom it may concern:*

Be it known that I, HERBERT A. CORLISS, a citizen of the United States, residing at Grants Pass, in the county of Josephine and State of Oregon, have invented a new and useful Auto Headlight, of which the following is a specification.

This invention relates to motor vehicle headlights, and more particularly to a manually controlled shield especially designed to direct the light rays from a lamp downwardly onto the road surface to properly illuminate the same, and at the same time eliminate the usual objectionable glare of the light.

Another object of the invention is to provide a device of this character which may be readily and easily positioned over the usual headlamp and adjusted to various positions with respect thereto, eliminating the necessity of making alterations in the lamp construction to mount the device.

A further object of the invention is to provide a shield of a bulged construction so that the light rays projected by the lamp will not be confined to the road surface directly in front of the machine but will illuminate sufficient portion of the road surface for the safety of driving.

A still further object of the invention is the provision of a device of this character which will be automatically returned to its inactive position, after it has been manually controlled.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view illustrating the headlight of an automobile as equipped with a shield constructed in accordance with the invention.

Figure 2 is a side elevational view of the shield.

Figure 3 is a plan view illustrating the locking mechanism of the shield.

Referring to the drawing in detail, the reference character 5 designates a headlight of a motor vehicle, which is of the usual construction and to which the shield forming the essence of this invention is secured.

The shield includes a supporting band 6 which is relatively wide and provided with inwardly extended integral flanges 7 providing means to grip the opposite sides of the usual lens ring to insure against lateral movement of the band 6.

This band 6 is split and provided with apertured ears 8 at its ends, which ears accommodate the bolt 9 whereby the ends of the band may be drawn towards each other and into close engagement with the lens ring or headlight. Carried by the band 6 is a bracket 10 formed with a laterally extended arm 11 that has an opening disposed at one end thereof, which opening acts as a guide for the flexible member 12 or actuating member to be hereinafter more fully described.

The bracket member 10 provides a support for the shaft 13 on which the shield proper rotates, the bracket being provided with spaced stops 14 to be engaged by finger 15 operating therebetween to restrict movement of the shield when moving to its inactive or active positions. Coiled around the shaft 13 is a spring 16 which has one end thereof anchored to the bracket 10 at 17, the opposite end thereof being secured to the arm 18 of the shield 19 to the end that when the shield is moved to its active position, the spring will be placed under tension to automatically return the shield to its inactive position when the operating member has been released.

As clearly shown by Figure 2 of the drawings, the shield 19 operates in spaced relation with the band, and is slightly bulged, to allow the light rays projected from the lamp, to pass downwardly and outwardly illuminating a sufficient portion of the road surface for the safety of driving.

Forming a part of the arm 18 is an extension 20 to which a flexible member 12 is connected, the flexible member 12 also passing through the guide opening in the arm 11, the opposite end of the flexible member being connected with the shaft 21 of the operating member, as by means of the nut 22.

Cut out portions 24 are formed on the shaft 21, which cut out portions are engaged by the spring fingers 25 mounted adjacent to the instrument board 26 to the end that the shaft 21 may be locked against movement, but may be operated by a slight rotary movement of the shaft to move the fingers 25 into engagement with the portions of the shaft 21 between the cut out portions 24, allowing the spring to move the shield 19 to its active position as shown by Figure 1.

From the foregoing it will be obvious that the operator of a machine equipped with a device constructed in accordance with the present invention, may by releasing the shaft 21 cause the shield to be moved to its inactive position as shown in dotted lines in Figure 1 of the drawing.

I claim:

A headlight shield comprising a supporting band, means for securing the band to a headlamp, a bracket member carried by the band and having an arm formed with a guide opening, a shield pivotally mounted on the bracket, an arm having a lateral extension, forming a part of the shield, a flexible member connected with the lateral extension and passing through the guide opening, said flexible member adapted to be operated to move the shield to its active position, and a coiled spring for returning the shield to its inactive position.

In testimony that I claim the foregoing as my own, I have hereto affixed my signature.

HERBERT A. CORLISS.